US007050136B2

(12) United States Patent
Lee et al.

(10) Patent No.: US 7,050,136 B2
(45) Date of Patent: May 23, 2006

(54) ARRAY SUBSTRATE FOR USE IN IN-PLANE SWITCHING MODE LIQUID CRYSTAL DISPLAY DEVICE

(75) Inventors: Gue-Tai Lee, Yeongeheon-si (KR); Cheol-Woo Park, Daegu (KR); Sang-Hyuk Lee, Ulsan (KR)

(73) Assignee: LG.Philips LCD Co., Ltd., Seoul (KR)

( * ) Notice: Subject to any disclaimer, the term of this patent is extended or adjusted under 35 U.S.C. 154(b) by 168 days.

(21) Appl. No.: 10/714,897

(22) Filed: Nov. 18, 2003

(65) Prior Publication Data
US 2004/0125304 A1 Jul. 1, 2004

(30) Foreign Application Priority Data
Dec. 31, 2002 (KR) ...................... 10-2002-0088539

(51) Int. Cl.
*G02F 1/1343* (2006.01)
(52) U.S. Cl. ..................................................... 349/141
(58) Field of Classification Search ................ 349/141, 349/143, 43
See application file for complete search history.

(56) References Cited

U.S. PATENT DOCUMENTS

| 5,598,285 A | 1/1997 | Kondo et al. |
| 5,745,207 A | 4/1998 | Asada et al. |
| 5,838,037 A | 11/1998 | Masutani et al. |
| 5,946,060 A | 8/1999 | Nishiki et al. |
| 5,990,987 A | 11/1999 | Tanaka |
| 6,028,653 A | 2/2000 | Nishida |
| 6,097,454 A | 8/2000 | Zhang et al. |
| 6,266,116 B1 * | 7/2001 | Ohta et al. ................... 349/141 |
| 6,839,111 B1 * | 1/2005 | Lee ............................ 349/126 |
| 6,859,248 B1 * | 2/2005 | Matsumoto et al. ......... 349/141 |
| 2004/0090564 A1 * | 5/2004 | Lee .............................. 349/43 |

FOREIGN PATENT DOCUMENTS

| JP | 09-005764 | 1/1997 |
| JP | 09-073101 | 3/1997 |
| JP | 09-101538 | 4/1997 |
| JP | 09-105908 | 4/1997 |

OTHER PUBLICATIONS

R. Kieler et al.; "In-Plane Switching of Nematic Liquid Crystals"; Japan Display '92; pp. 547-550.

(Continued)

*Primary Examiner*—Toan Ton
(74) *Attorney, Agent, or Firm*—McKenna Long & Aldridge LLP

(57) ABSTRACT

The present invention is related to an array substrate for use in an IPS-LCD device, which prevents disclination that may occur between common and pixel electrodes. The pixel electrode in a pixel region includes a plurality of pixel fingers and a pixel horizontal portion, and the common electrode in the pixel region includes a plurality of common fingers extending from a common line parallel with the pixel fingers. Each of the common fingers has a gentle slope outline at a portion where the common finger meets the pixel finger, wherein the common fingers do not meet the pixel horizontal portion in the pixel region.

32 Claims, 7 Drawing Sheets

OTHER PUBLICATIONS

M. Oh-e, et al.; "Principles and Characteristics of Electro-Optical Behaviour with In-Plane Switching Mode"; Asia Display '95; pp. 577-580.

M. Ohta et al.; "Development of Super-TFT-LCDs with In-Plane Switching Display Mode"; Asia Display '95; pp. 707-710.

S. Matsumoto et al.; Display Characteristics of In-Plane Switching (IPS) LCDs and a Wide-Viewing-Angle 14.5in. OPS TFT-LCD; Euro Display '96; pp. 445-448.

H. Wakemoto et al.; "An Advanced In-Plane Switching Mode TFT-LCD"; SID 97 Digest; pp. 929-932.

S.H. Lee et al.; High-Transmittance, Wide-Viewing-Angle Nematic Liquid Crystal Display Controlled by Fringe-Field Switching; Asia Display '98; pp. 371-374.

S. Endoh et al.; "Diagonal Super-TFT-LCDs with Mega Wide Viewing Angle and Fast Response Speed of 20ms"; IDW '99; pp. 187-190.

* cited by examiner

ARRAY SUBSTRATE FOR USE IN IN-PLANE SWITCHING MODE LIQUID CRYSTAL DISPLAY DEVICE

This application claims the benefit of Korean Patent Application No. 2002-0088539, filed on Dec. 31, 2002, which is hereby incorporated by reference for all purposes as if fully set forth herein.

BACKGROUND OF THE INVENTION

1. Field of the Invention

The present invention relates to a liquid crystal display (LCD) device, and more particularly, to an array substrate for use in an in-plane switching mode liquid crystal display device (IPS-LCD).

2. Discussion of the Related Art

A liquid crystal display device uses the optical anisotropy and polarization properties of liquid crystal molecules to produce an image. Liquid crystal molecules have a definite alignment direction as a result of their long, thin shapes. That alignment direction can be controlled by an applied electric field. In other words, as the direction of an applied electric field changes, so does the alignment of the liquid crystal molecules. Due to the optical anisotropy, the refraction of incident light depends on the alignment direction of the liquid crystal molecules. Thus, by properly controlling an applied electric field, a desired light image can be produced.

Of the different types of known LCDs, active matrix LCDs (AM-LCDs), which have thin film transistors and pixel electrodes arranged in a matrix form, are the subject of significant research and development because of their high resolution and superiority in displaying moving images.

LCD devices have wide application in office automation (OA) equipment and video units because they are light and thin and have low power consumption characteristics. The typical liquid crystal display (LCD) panel has an upper substrate, a lower substrate and a liquid crystal layer interposed therebetween. The upper substrate, commonly referred to as a color filter substrate, usually includes a common electrode and color filters. The lower substrate, commonly referred to as an array substrate, includes switching elements, such as thin film transistors (TFTs) and pixel electrodes.

As previously described, LCD device operation is based on the principle that the alignment direction of the liquid crystal molecules is dependent upon an electric field applied between the common electrode and the pixel electrode. Thus, the alignment direction of the liquid crystal molecules is controlled by the application of an electric field to the liquid crystal layer. When the alignment direction of the liquid crystal molecules is properly adjusted, incident light is refracted along the alignment direction to display image data. The liquid crystal molecules function as an optical modulation element having variable optical characteristics that depend upon polarity of the applied voltage.

In a related art LCD device, since the pixel and common electrodes are positioned on the lower and upper substrates, respectively, the electric field induced between them is perpendicular to the lower and upper substrates. However, the related art LCD devices having the longitudinal electric field have a drawback in that they have a very narrow viewing angle. In order to solve the problem of narrow viewing angle, in-plane switching liquid crystal display (IPS-LCD) devices have been proposed. The IPS-LCD devices typically include a lower substrate where a pixel electrode and a common electrode are disposed, an upper substrate having no electrode, and a liquid crystal interposed between the upper and lower substrates. A detailed explanation about the lower substrate (i.e., array substrate) of the IPS-LCD device will be provided referring to figures.

FIG. 1A is a plan view illustrating one pixel of an array substrate of an inplane switching mode liquid crystal display (IPS-LCD) device according to a related art. As shown, gate line 12 is transversely disposed on a substrate 10. A common line 16 is spaced apart from the gate line 12, and disposed parallel with the gate line 12. A data line 24 is disposed across and substantially perpendicular to the gate and common lines 12 and 16. The data and gate line 24 and 12 define a pixel area P.

A switching device, e.g., a thin film transistor T, is positioned near the crossing of the gate and data lines 12 and 24. As illustrated in FIG. 1, the thin film transistor T includes a gate electrode 14, an active layer 20, a source electrode 26 and a drain electrode 28. The gate electrode 14 protrudes from the gate line 12 at the crossing of the gate and data lines 12 and 24. The source electrode 26 is positioned and electrically connected with the data line 24. Namely, the gate electrode 14 extends from the gate line 12, while the source electrode 26 extends from the data line 24. The drain electrode 28 is spaced apart from the source electrode 26 and overlaps the gate electrode 14 and the active layer 20. In the thin film transistor T of FIG. 1A, the source electrode 26 has a U-shape and the drain electrode 28 has an I-shape. The I-shaped drain electrode 28 is disposed inside the U-shaped source electrode 26 so that the U-shaped source electrode 26 surrounds the I-shaped drain electrode 28. The active layer 20 is located right above the gate electrode 14 and under the source and drain electrodes 26 and 28. Thus, the source electrode 26 and the drain electrode 28 overlap portions of the active layer 20, respectively.

A pixel electrode 30 connected to the drain electrode 28 is disposed in the pixel area P. The pixel electrode 30 includes a first horizontal portion 30a electrically connected to the drain electrode 28 next to the gate line 12, pixel fingers 30b parallel with the data lines 24 and a second horizontal portion 30c above the common line 16. The first and second horizontal portions 30a and 30c and the pixel fingers 30b are formed as one united body. A common electrode 17 including common fingers 17a and a common horizontal portion 17b is also disposed in the pixel area P. The common fingers 17a extend from the common line 16 and the common horizontal portion 17b are connected to one ends of the common fingers 17a to connect them. The common fingers 17a and the common horizontal portion 17b are formed of as one united body with the common line 16. The common fingers 17a are parallel with the data line 24 and adjacent to the pixel finger 30b of the pixel electrode 30, so that the pixel finger 30b of the pixel electrode 30 is positioned between the common fingers 17a. Furthermore, the common fingers 17a are spaced apart from the data line 24.

There is a storage capacitor C that is parallel-connected to the pixel at the top of the pixel area P. The storage capacitor C is formed of a portion of the common line 16, a second horizontal portion 30c of the pixel electrode 30, and a dielectric layer (not shown). Namely, the portion of the common line 16 acts as a first electrode, and the second horizontal portion 30c of the pixel electrode 30 acts as a second electrode in the storage capacitor C.

The array substrate for the IPS-LCD device of FIG. 1A only has a single domain in the pixel. However, the pixel can have multiple domains by way of modifying the pixel and common electrodes' shape.

FIG. 1B is a plan view illustrating one pixel of an array substrate of an inplane switching mode liquid crystal display (IPS-LCD) device having multiple domains according to a related art. The same reference numbers will be used in FIG. 1B to refer to the same parts of FIG. 1A, and detailed description will be omitted except the differences from FIG. 1A. In FIG. 1B, all of common fingers 17a and pixel fingers 30b has substantially zigzag shape so that the multiple domains are achieved in the pixel region P. The multiple domains of FIG. 1B have an advantage of viewing angle rather than the single domain of FIG. 1A.

However, the array substrates shown in FIGS. 1A and 1B have some disadvantages. Some disclination occurs in upper and lower portions of the pixel area where the common electrodes and the pixel electrodes cross each other. The reason of disclination occurrence is that the electric fields generated by the common and pixel electrodes are distorted in the portions F1 of FIG. 1B and F2 of FIG. 1A. The distortions of the electric field make the liquid crystal molecules abnormally arrange and align and thus cause the light leakage.

FIG. 2 is an enlarged plan view of a portion F1 of FIG. 1B and particularly illustrates the distortions of the electric field in a portion where the common electrodes and the pixel electrodes cross each other.

As illustrated in FIG. 2, because the common fingers 17a and the pixel fingers 30b have zigzag shapes for the multiple domains, they tilt to one side. At this point, some distortions of the electric field partially occur between the common finger 17a and the pixel finger 30b. In a space H where the common finger 17a meets the pixel horizontal portion 30c (i.e., a space between the pixel finger 30b on left and the common finger 17a on right), there are regions B and B' where the electric fields have substantially different distribution. The electric fields are induced to be substantially perpendicular to the pixel and common electrodes 30 and 17 in a direction from the pixel electrode 30 to the common electrode 17 as indicated by dotted arrows in FIG. 2. However, a distortion of the electric field appears around a corner where the pixel electrode 30 meets the common electrode 17. Thus, the liquid crystal molecules are irregularly arranged, especially in the region B'. The detailed explanation about the distortion will be shown with reference to FIGS. 3 and 4.

FIGS. 3 and 4 conceptually illustrate the liquid crystal molecule arrangement in accordance with the electric fields generated in regions A, A', B and B' of FIG. 2.

In FIG. 3, the electric fields E have the same direction in the regions A and A' so that the liquid crystal molecules have the same movement direction in both regions A and A'. Because the electric fields E generated from the pixel electrode 30b and 30c to the common electrode 17a have the same angle of 130° (degrees) from an X-axis in the regions A and A', the arrangement direction of liquid crystal molecules is the same both in the region A and in the region A'.

However, according to FIG. 4, the liquid crystal molecules located in the regions B and B' have the opposite rotary movement to each other. Namely, the electric fields of the regions B and B' have the different direction of −45° (degrees) and 45° (degrees), respectively, from the X-axis. Therefore, the arrangement of the liquid crystal molecules in the region B has the direction opposite to the arrangement of the liquid crystal molecules in the region B'. As a result, the disclination occurs around a boundary of the regions B and B'.

The reason for forming the malfunction of the liquid crystal molecules in the portion where the common finger 17a on right meets the pixel horizontal portion 30c is that the common finger 17a sharply crosses the pixel horizontal portion 30c in a portion B'. Namely, the common finger 17a forms an acute angle with the pixel horizontal portion 30c so that the electric field abnormally distributes and is distorted in the portion B'. This phenomenon also occurs in the case when the pixel and common fingers have the straight shape, as shown in FIG. 1A.

FIG. 5 is an enlarged plan view of a portion F2 of FIG. 1A and particularly illustrates the distortions of the electric field in a portion where the common electrodes and the pixel electrodes cross each other.

As illustrated by the dotted enlarged circle of FIG. 5, the electric field distribution is abnormal in a crossing portion where the common finger 17a crosses the pixel finger 30b or the pixel horizontal portion 30a. In the enlarged view of FIG. 5, the electric fields are perpendicular to the common and pixel fingers 17a and 30b in a first division D1, but they are distorted in a second division D2. Therefore, the disclination occurs around a boundary between the first and second divisions D1 and D2.

SUMMARY OF THE INVENTION

Accordingly, the present invention is directed to an array substrate for use in in-plane switching mode liquid crystal display device that substantially obviates one or more of the problems due to limitations and disadvantages of the related art.

An advantage of the present invention is to provide an array substrate for for use in the IPS-LCD device, which has an inventive structure of common and pixel electrodes to prevent a disclination.

Another advantage of the present invention is to provide an array substrate for use in the IPS-LCD device, which is designed to make the liquid crystal molecules properly align in the pixel region for a high picture quality in displaying image.

Additional features and advantages of the invention will be set forth in the description, which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an embodiment of the present invention provides an array substrate for use in an IPS-LCD device, including: a gate line over a substrate and disposed in a first direction; a common line over the substrate and disposed in the first direction next to the gate line; a data line over the substrate and disposed in a second direction substantially perpendicularly crossing both the gate line and the common line to define a pixel region; a thin film transistor at a crossing of the gate and data lines; a pixel electrode in the pixel region, the pixel electrode having a plurality of pixel fingers and a pixel horizontal portion; and a common electrode in the pixel region, the common electrode having a plurality of common fingers extending from the common line parallel with the pixel fingers, wherein each of the common fingers has a gentle slope outline at a portion where the common finger meets the pixel finger.

In another aspect of the present invention, the thin film transistor includes a gate electrode connected to the gate line, an active layer, a source electrode connected to the data line, and a drain electrode connected to the pixel electrode.

The pixel fingers and the common fingers have zigzag shapes. The plurality of pixel fingers are disposed in the second direction. The pixel horizontal portion connects the plurality of pixel fingers and is disposed in the first direction. Further, the pixel horizontal portion is electrically connected with the drain electrode of the thin film transistor. The common line and the common electrode are formed as one united body. The pixel fingers and the pixel horizontal portion are formed as one united body. The common fingers do not meet the pixel horizontal portion in the pixel region.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENT

Reference will now be made in detail to an embodiment of the present invention, an example of which is illustrated in the accompanying drawings. Wherever possible, similar reference numbers will be used throughout the drawings to refer to the same or similar parts.

Figure 1A:
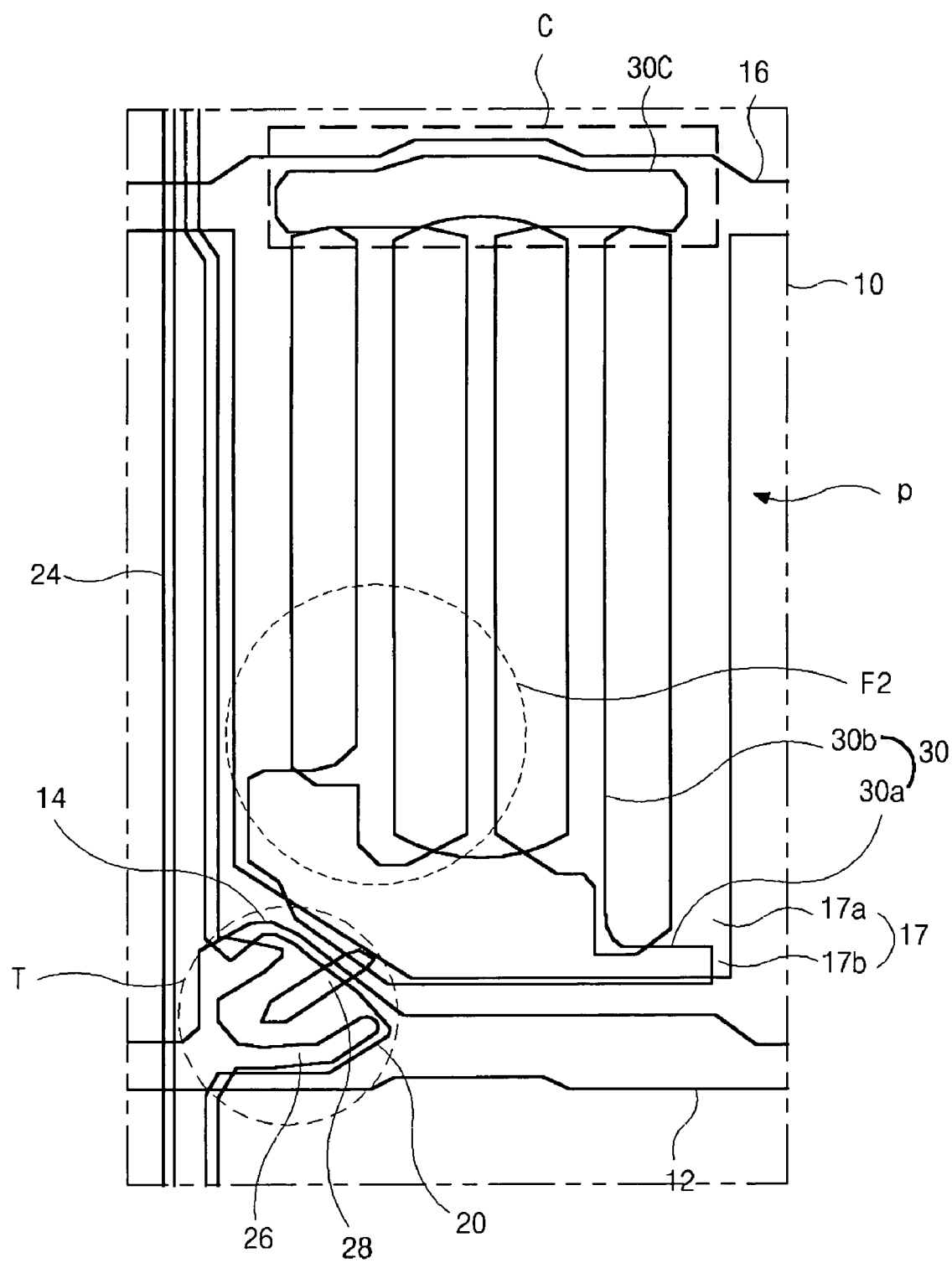
FIG. 1A is a plan view illustrating one pixel of an array substrate of an inplane switching mode liquid crystal display (IPS-LCD) device according to a related art.
Figure 1B:
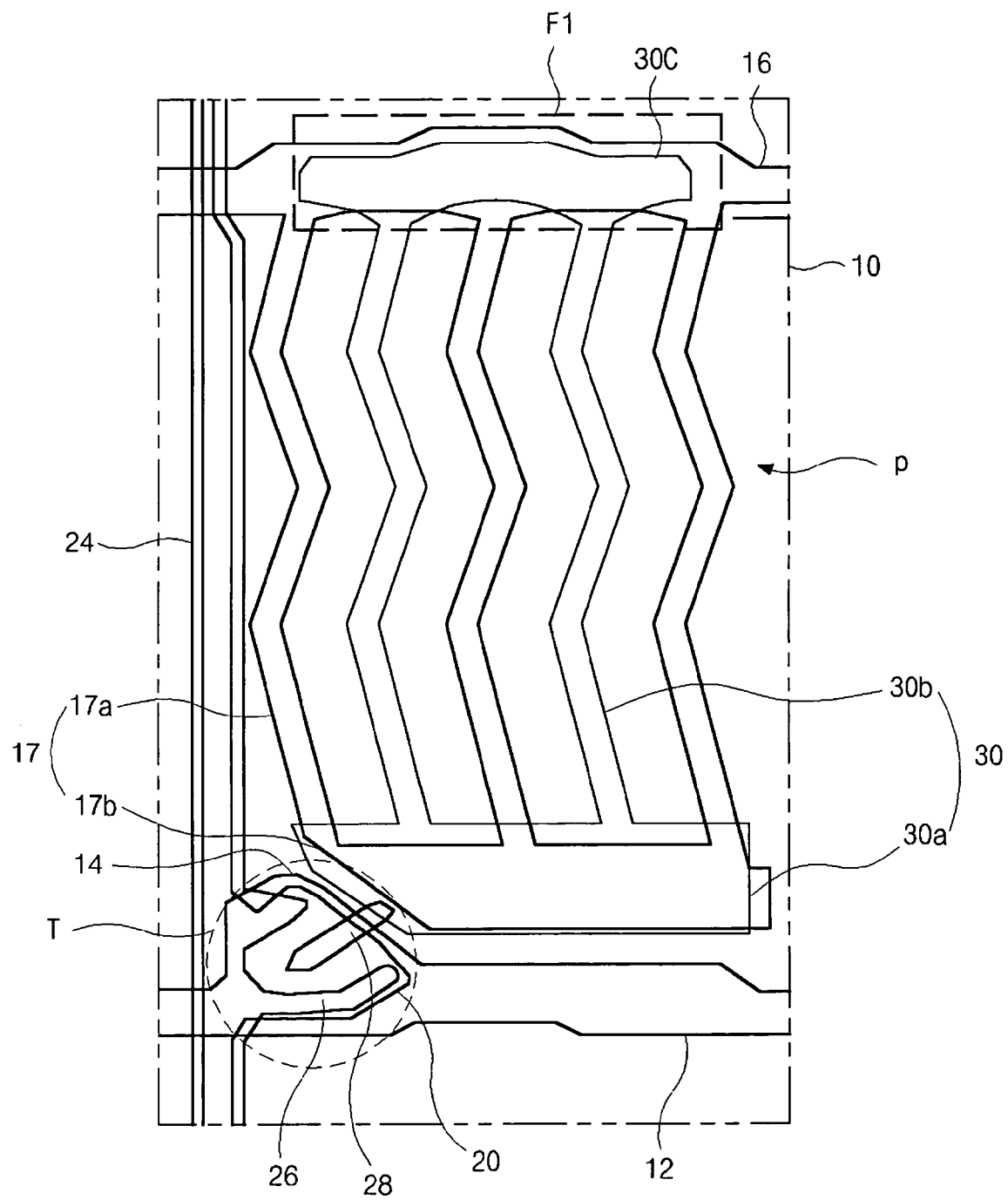
FIG. 1B is a plan view illustrating one pixel of an array substrate of an inplane switching mode liquid crystal display (IPS-LCD) device having multiple domains according to a related art.
Figure 2:
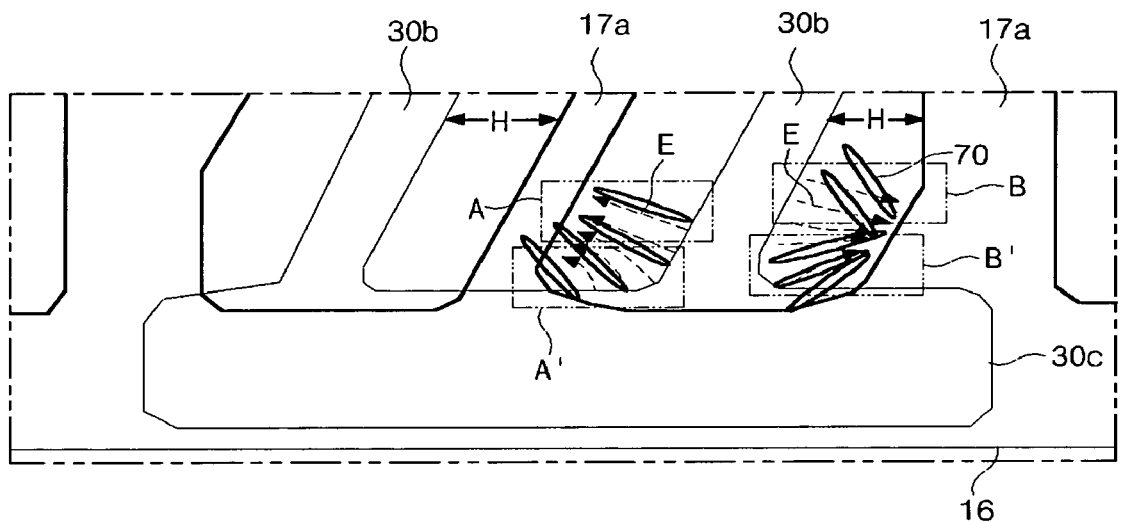
FIG. 2 is an enlarged plan view of a portion F1 of FIG. 1B and particularly illustrates the distortions of the electric field in a portion where the common electrodes and the pixel electrodes cross each other.
Figure 3:
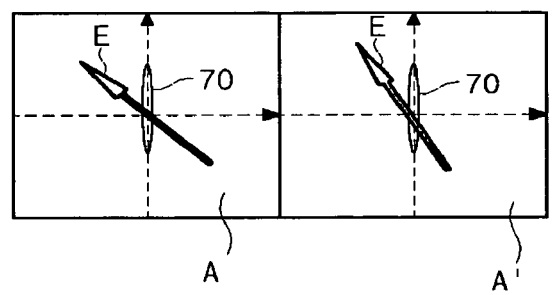
FIGS. 3 and 4 conceptually illustrate the liquid crystal molecule arrangement in accordance with the electric fields generated in regions A, A', B and B' of FIG. 2.
Figure 4:
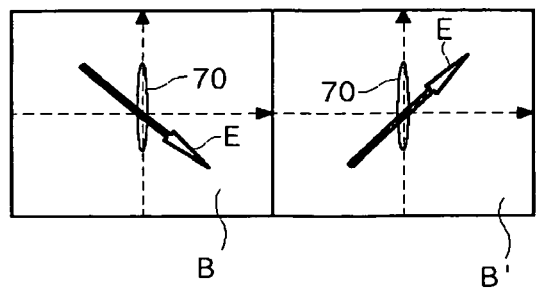
Figure 5:
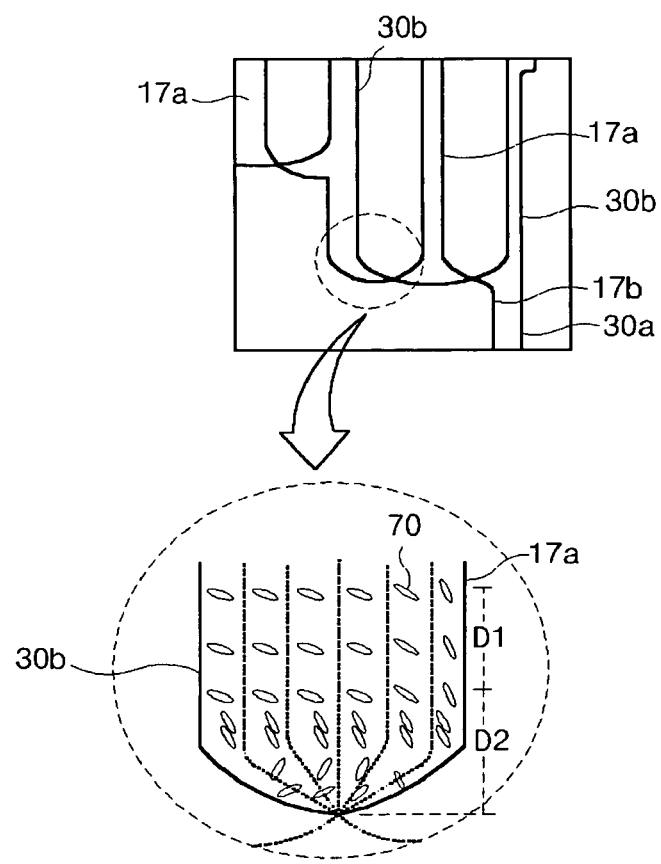
FIG. 5 is an enlarged plan view of a portion F2 of FIG. 1A and particularly illustrates the distortions of the electric field in a portion where the common electrodes and the pixel electrodes cross each other.
Figure 6:
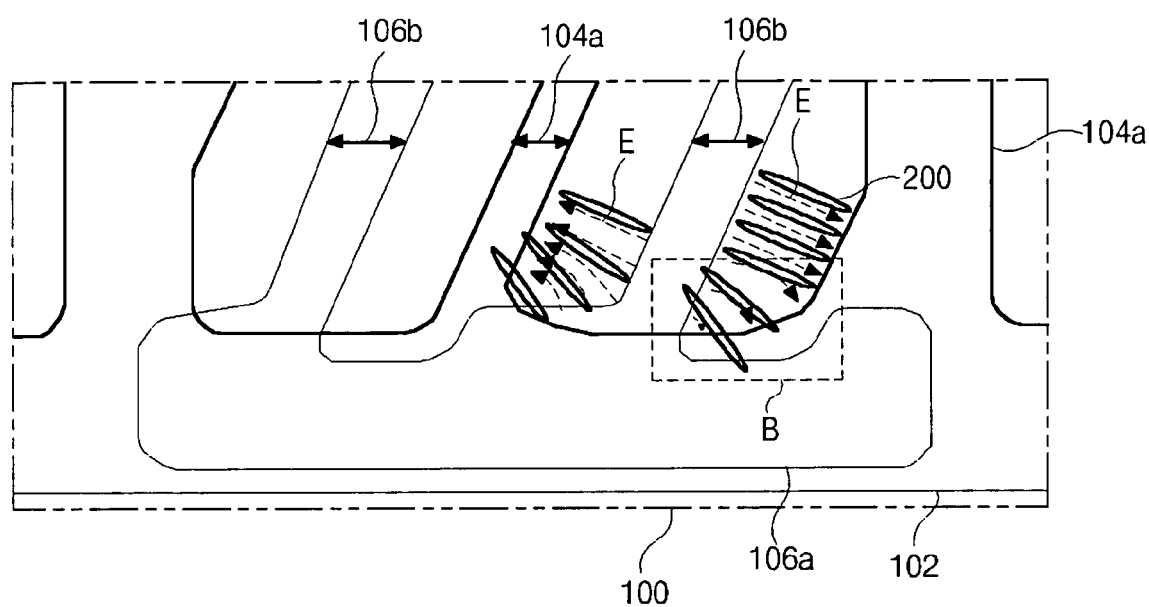
FIG. 6 is an enlarged plan view conceptually corresponding to FIG. 2, but illustrating the electric fields and the liquid crystal molecules' alignment according to the present invention in portions where the common electrodes and the pixel electrode cross each other.

FIG. 6 is an enlarged plan view conceptually corresponding to FIG. 2, but illustrating the electric fields and the liquid crystal molecules' alignment according to the present invention in portions where the common electrode and the pixel electrode cross each other. For simplifying the explanation, the modified parts according to the present invention are only explained.

In FIG. 6, a common electrode 104 and a pixel electrode 106 are formed over a substrate 100. The pixel electrode 106 includes a pixel horizontal portion 106a and pixel fingers 106b. The pixel horizontal portion 106a is disposed overlapping a common line 102. The pixel horizontal portion 106a connects the pixel fingers 106b one another. The common electrode 104 includes common fingers 104a that extends from the common line 102. The common fingers 104a are parallel with the pixel fingers 106b. At least some of the common and pixel fingers 104a and 106b may be inclined to one side, and thus the common and pixel electrodes 104 and 106 may be used for the array substrate having the multiple domains in the pixel. A bent angle of the pixel and common electrodes 104 and 106 is about ±1–30 degrees with respect to an alignment direction of the liquid crystal molecules. The bent angle may be formed at angle ±15–20 degrees.

In the configuration illustrated in FIG. 6, it is distinguishable that the common fingers 104a are designed not to cross the pixel horizontal portion 106a. Furthermore, the common fingers 104a are also designed each to have a gentle slope side at a portion where the common finger 104a meets the pixel finger 106b. With these design and configuration, the electric fields E distributes parallel from the pixel fingers 106b to the common fingers 104a. Therefore, the liquid crystal molecules 200 in the region B are properly aligned in the same direction in accordance with the electric fields E, and no disclination occurs. Namely, the liquid crystal molecules 200 in the regions B rotates in the same direction as the other liquid crystal molecules disposed between the common finger 104a on right and the pixel finger 106b on left.

Figure 7:
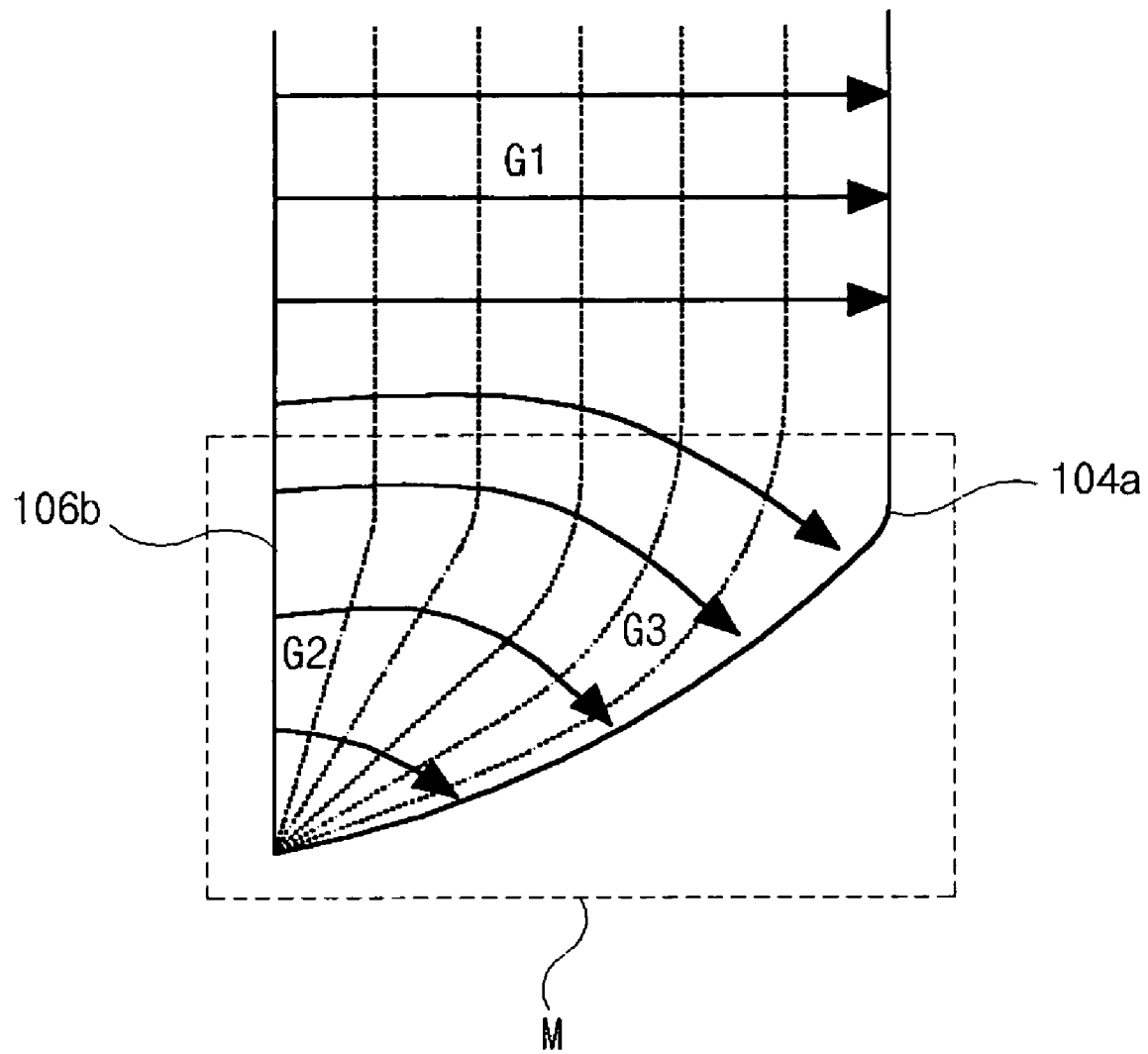
FIG. 7 conceptually illustrates the common and pixel electrodes and the electric fields according to the present invention.

FIG. 7 conceptually illustrates the common and pixel electrodes and the electric fields according to the present invention.

In FIG. 7, the common finger 104a and the pixel finger 106b have a straight shape for use in the array substrate having a single domain in the pixel. The pixel finger 106b on left has a straight outline at a portion M where the common finger 104a on right meets the pixel finger 106b on left. Further, the common finger 104a on right has a gentle slope outline at the portion M where the common finger 104a on right meets the pixel finger 106b on left.

According to the aforementioned structure of FIG. 7, the electric fields generated from the pixel finger 106b on left to the common finger 104a on right can regularly distribute in the same direction so that the liquid crystal molecules can be aligned in the same rotational direction no matter if the liquid crystal molecules are located in regions G1, G2 and G3.

Figure 8:
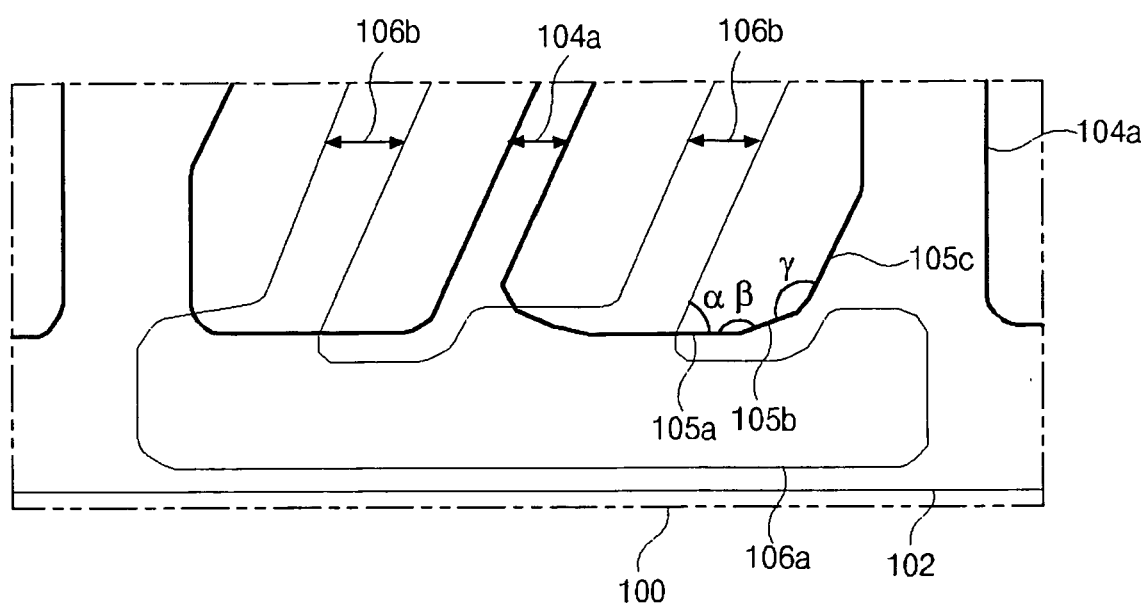
FIG. 8 is a plan view conceptually illustrating angles of gentle slope side of common fingers according to the present invention in portions where the common electrodes and the pixel electrode cross each other.

FIG. 8 is the plan view of FIG. 6 conceptually illustrating angles of gentle slope side of common fingers according to the present invention in portions where the common electrodes and the pixel electrode cross each other.

As shown in FIG. 8, a gentle slope side 105 of the common finger 104a on right has an angular shape and includes a first portion 105a, a second portion 105b and a third portion 105c. The first portion 105a is horizontally disposed substantially perpendicular to the data line and forms an angle α of about 70 degrees with the pixel finger 106b. The second portion 105b forms an angle β of about 160 degrees with the first portion 105a, and then the third portion 105c forms an angle of γ of about 130 degrees with the second portion 105b. In the present invention, it is important that the second and third portions 105b and 105c of the gentle slope side have obtuse angles that are greater than 90 degrees. Although FIG. 8 shows that the gentle slope side 105 is angular, the gentle slope side 105 can have a circular shape, e.g., the edge portions or vertices of the intersections of the first portion, the second portion and the third portion may be rounded, as shown in FIG. 7.

The main point of the present invention is that the common finger and the pixel finger are designed to generate the electric fields therebetween to have the same direction. Therefore, the electric fields do not have any symmetric distribution in the space between the common finger on right and the pixel finger on left.

If the electric field has the symmetric distribution of the related art as described in FIGS. 1–5, the liquid crystal molecules have the opposite rotary movement direction although they have the initial alignment direction in between the common and pixel fingers. Therefore, the common and pixel electrodes of the present invention are designed to generate the electric fields to have the same direction. Accordingly, the disclination is prevented and the high image quality can be achieved in the IPS-LCD device.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An array substrate for use in an IPS-LCD device, comprising:
    a gate line over a substrate and disposed in a first direction;
    a common line over the substrate and disposed in the first direction next to the gate line;
    a data line over the substrate and disposed in a second direction substantially perpendicularly crossing both the gate line and the common line to define a pixel region;
    a thin film transistor at a crossing of the gate and data lines;
    a pixel electrode in the pixel region, the pixel electrode having a plurality of pixel fingers and
    a pixel horizontal portion; and
    a common electrode in the pixel region, the common electrode having a plurality of common fingers extending from the common line parallel with the pixel fingers,
    wherein each of the common fingers has a gentle slope outline at a portion where the common finger meets the pixel finger,
    wherein the gentle slope outline includes a first portion, a second portion and a third portion having different slopes from one another, and
    wherein the first portion is at an angle with respect to the common fingers, wherein the angle is between about 70 degrees and about 90 degrees.

2. The array substrate according to claim 1, wherein the thin film transistor includes a gate electrode connected to the gate line, an active layer, a source electrode connected to the data line, and a drain electrode connected to the pixel electrode.

3. The array substrate according to claim 1, wherein the pixel fingers and the common fingers have zigzag shapes.

4. The array substrate according to claim 1, wherein a bent angle of the zigzag shapes is about ±1–30 degrees with respect to an alignment direction of a liquid crystal layer.

5. The array substrate according to claim 1, wherein the plurality of pixel fingers are disposed in the second direction.

6. The array substrate according to claim 1, wherein the pixel horizontal portion connects the plurality of pixel fingers and is disposed in the first direction.

7. The array substrate according to claim 6, wherein the pixel horizontal portion is electrically connected with the drain electrode of the thin film transistor.

8. The array substrate according to claim 1, wherein the common line and the common electrode are formed as one united body.

9. The array substrate according to claim 1, wherein the pixel fingers and the pixel horizontal portion are formed as one united body.

10. The array substrate according to claim 1, wherein the common fingers do not meet the pixel horizontal portion in the pixel region.

11. The array substrate according to claim 1, wherein the first portion is substantially perpendicular to the data line.

12. The array substrate according to claim 1, wherein the first portion is at an angle of about 70 degrees with respect to the pixel fingers.

13. The array substrate according to claim 1, wherein the second portion is at an angle of about 160 degrees with respect to the first portion.

14. The array substrate according to claim 1, wherein the third portion is at an angle of about 130 degrees with respect to the second portion.

15. The array substrate according to claim 1, wherein the second portion and the third portion meet at an obtuse angle.

16. The array substrate according to claim 1, wherein the vertices between the first portion, the second portion and the third portion are rounded.

17. A method of fabricating an array substrate for use in an IPS-LCD device, comprising:
    forming a gate line over a substrate and disposed in a first direction;
    forming a common line over the substrate and disposed in the first direction next to the gate line;
    forming a data line over the substrate and disposed in a second direction substantially perpendicularly crossing both the gate line and the common line to define a pixel region;
    providing a thin film transistor at a crossing of the gate and data lines;
    forming a pixel electrode in the pixel region, the pixel electrode having a plurality of pixel fingers and a pixel horizontal portion; and
    forming a common electrode in the pixel region, the common electrode having a plurality of common fingers extending from the common line parallel with the pixel fingers,
    wherein each of the common fingers has a gentle slope outline at a portion where the common finger meets the pixel finger,
    wherein the gentle slope outline includes a first portion, a second portion and a third portion having different slopes from one another, and
    wherein the first portion is at an angle with respect to the common fingers, wherein the angle is between about 70 degrees and about 90 degrees.

18. The method of fabricating an array substrate of claim 17, wherein the thin film transistor includes a gate electrode connected to the gate line, an active layer, a source electrode connected to the data line, and a drain electrode connected to the pixel electrode.

19. The method of fabricating an array substrate according to claim 17, wherein the pixel fingers and the common fingers have zigzag shapes.

20. The method of fabricating an array substrate according to claim 19, wherein a bent angle of the zigzag shapes is about ±1–30 degrees with respect to an alignment direction of a liquid crystal layer.

21. The method of fabricating an array substrate according to claim 17, wherein the plurality of pixel fingers are disposed in the second direction.

22. The method of fabricating an array substrate according to claim 17, wherein the pixel horizontal portion connects the plurality of pixel fingers and is disposed in the first direction.

23. The method of fabricating an array substrate according to claim 22, wherein the pixel horizontal portion is electrically connected with the drain electrode of the thin film transistor.

24. The method of fabricating an array substrate according to claim 17, wherein the common line and the common electrode are formed as one united body.

25. The method of fabricating an array substrate according to claim 17, wherein the pixel fingers and the pixel horizontal portion are formed as one united body.

26. The method of fabricating an array substrate according to claim 17, wherein the common fingers do not meet the pixel horizontal portion in the pixel region.

27. The method of fabricating an array substrate according to claim 17, wherein the first portion is substantially perpendicular to the data line.

28. The method of fabricating an array substrate according to claim 17, wherein the first portion is at an angle of about 70 degrees with respect to the common fingers.

29. The method of fabricating an array substrate according to claim 17, wherein the second portion is at an angle of about 160 degrees with respect to the first portion.

30. The method of fabricating an array substrate according to claim 17, wherein the third portion is at an angle of about 130 degrees with respect to the second portion.

31. The method of fabricating an array substrate according to claim 17, wherein the second portion and the third portion meet at an obtuse angle.

32. The method of fabricating an array substrate according to claim 17, wherein the vertices between the first portion, the second portion and the third portion are rounded.

* * * * *